United States Patent [19]

Salmon et al.

[11] Patent Number: 5,703,612
[45] Date of Patent: Dec. 30, 1997

[54] ILLUMINATED POINTER FOR AN ANALOG GAUGE AND RELATED METHOD OF USE AND MANUFACTURE

[75] Inventors: Michael E. Salmon, Lapeer; Brent W. Pankey, Davison, both of Mich.

[73] Assignee: Nu-Tech & Engineering, Inc., Lapeer, Mich.

[21] Appl. No.: 376,003

[22] Filed: Jan. 20, 1995

[51] Int. Cl.⁶ .................. G09G 3/00; G08B 5/24
[52] U.S. Cl. .............. 345/75; 340/815.78; 340/815.42; 340/815.47; 340/815.45; 116/286; 116/288; 116/328; 116/DIG. 6; 116/DIG. 36; 362/23; 362/26
[58] Field of Search .............. 345/75; 340/815.78, 340/815.42, 815.47, 441, 461, 525, 815.45, 815.79, 815.8, 815.5, 815.55, 815.68, 459, 462, 466; 116/286, 287, 288, 300, 308, 328, 332, DIG. 5, DIG. 6, DIG. 36; 362/23, 26, 27, 29, 30, 31

[56] References Cited

U.S. PATENT DOCUMENTS

| | | | |
|---|---|---|---|
| 2,886,911 | 5/1959 | Hardesty | 116/288 |
| 4,004,546 | 1/1977 | Harland | 116/238 |
| 4,609,817 | 9/1986 | Mumzhiu | 250/227 |
| 4,771,368 | 9/1988 | Tsukamoto et al. | 362/29 |
| 4,882,659 | 11/1989 | Gloudemans | 362/61 |
| 4,959,759 | 9/1990 | Kohler | 116/288 |
| 4,991,064 | 2/1991 | Clem | 116/288 |
| 5,128,659 | 7/1992 | Roberts et al. | 340/980 |

OTHER PUBLICATIONS

"High Power Automtove LED" Technical Data, Hewlett Packard, Jan. 1994.

*Primary Examiner*—Donnie L. Crosland
*Attorney, Agent, or Firm*—Fildes & Outland, P.C.

[57] ABSTRACT

An instrument panel includes analog gauges with pointers illuminated independently of the light source illuminating the scale indicia. Light is transmitted into the pointer via a facet having an inclined reflective surface through which a gauge motor output shaft passes. The facet may be integrally formed in the light distribution layer which illuminates the scale indicia or a separate discreet component. A novel telltale used in conjunction with an instrument panel having a light distribution layer is also provided which illuminates the telltale indicia by passing light through the light distribution layer without affecting the illumination of other indicia in the graphic layer. Method of manufacturing analog gauges as well as method for using an analog gauge to transmit information to a viewer is also molded.

11 Claims, 8 Drawing Sheets

ILLUMINATED POINTER FOR AN ANALOG GAUGE AND RELATED METHOD OF USE AND MANUFACTURE

TECHNICAL FIELD

The present invention relates to gauges for instrument panels, their use and manufacture, particularly, gauges of the type used in automotive instrument panels.

BACKGROUND ART

Historically, automotive instrument panels are one of the longest lead time components to develop when manufacturing a new automobile body. Instrument panel development and tooling takes a great deal of time because of the typical complexity of the instrument panel case required to locate the gauges and provide the proper lighting. Lighting related problems directly result in case complexity and invariably result in much trial and error development work in order to uniformly light the instrument panel gauges, pointers and telltales.

In an effort to simplify the manufacture of automotive instrument panels, the assignee of the present invention developed an instrument panel utilizing a light distribution layer fox illuminating the entire instrument panel with relatively few light sources. This instrument panel and related method of manufacture are shown in published PCT patent application No. WO 92/19992 having an international publication date of Nov. 12, 1992. This PCT application, as well as typical prior art instrument panels, illuminate analog gauge pointers by introducing light into the pointers using a light pipe (or light distribution layer) having a conical hole formed in the light pipe to direct light axially into the pointer.

Alternatively, a cylindrical hole is formed in the light pipe and a pointer boss projects into the light pipe cylindrical hole to pick up light. A problem associated with these types of pointer lighting systems is that they are relatively inefficient and frequently multiple light sources are needed to provide ample pointer lighting for each gauge.

In the conventional systems, since pointers are illuminated by the same light source or sources that illuminate the instrument panel graphic layer, the intensity of a pointer lighting cannot be varied independently of the graphic layer.

Other problems commonly facing instrument panel designers using the prior art techniques, is the design and placement of telltale lights. It is normally difficult to place telltales adjacent to an analog gauge. There is typically too much physical hardware associated with the gauge motor and associated light pipe to locate a telltale within the gauge scale in small meters such as fuel gauges or oil pressure gauges to display a low fuel or low oil pressure telltale within the analog gauge scale. Similarly, the illumination of telltales which are positioned adjacent other gauge indicia results in the telltale light source partially illuminating the adjacent scale indicia causing discoloration and non-uniformity in the indicia lighting.

SUMMARY OF THE INVENTION

Accordingly, an analog gauge of the present invention is provided which has a graphic layer with scale indicia and an aperture for facilitating the installation of a gauge pointer on the front surface of the graphic layer. A gauge motor is located below the rear surface of the graphic layer to rotate the gauge pointer relative to the scale indicia providing the viewer of the gauge with analog information. A facet redirects light into the gauge pointer. The facet is located between the gauge motor and the pointer providing an inclined first light reflective surface having a bore extending therethrough to enable the gauge motor output shaft to freely pass. The first light reflective surface redirects light within the facet which is generally normal to the gauge shaft to an axial path parallel to the gauge output shaft to illuminate the pointer. A graphic layer light cooperates with the graphic layer to illuminate the indicia thereon. A separate and independently regulated pointer light source with the facet for illuminating the pointer enabling the degree of illumination of the pointer independently controlled.

The analog gauge of the present invention enables the implementation of a novel method of providing graphical information to a viewer. An analog gauge which is rotatable by a gauge motor relative to scale indicia is illuminated by a pointer light source which is independent of a light source for illuminating the scale indicia on a graphic layer. Information is transmitted to a viewer of the gauge in a normal manner by rotating the gauge motor and positioning the pointer relative to scale indicia. When the measured parameter falls outside of a selected normal operating range, pointer illumination can be varied in order to attract the viewer's attention to the pointer.

An instrument panel embodiment is provided having novel telltale lighting. The instrument panel has at least one analog gauge formed by a graphic layer defining an analog scale indicia illuminated by a light distribution layer having a graphic layer light source. The telltale light is located behind the graphic layer in order to transmit light through the graphic and light distribution layers to provide a telltale signal to the viewer independent of the graphic layer light source. The telltale light does not affect the illumination of other indicia on the graphic layer.

BRIEF DESCRIPTION OF THE DRAWINGS

FIG. 7a is a cross-sectional side elevation of a second facet embodiment;

FIG. 7b is a fragmentary plan view of the facet of FIG. 7a;

FIGS. 14 and 14a are illustrations of an aperture formed in the light distribution layer for cooperating with a light source;

BEST MODES FOR CARRYING OUT THE INVENTION

Referring to FIGS. 1–6, an instrument cluster 20 of the present invention is illustrated. Instrument panel 20 is made up of five stacked layers: a bezel and lens assembly 22, graphic layer 24, light distribution layer 26, circuit board 28 and dust cover 30. The light distribution layer 26 and the circuit board 28 are affixed to bezel assembly 22 to form a rigid structural unit. Dust cover 30 unlike rear cases of the prior art, is a simple plastic part which merely encloses the assembly.

Figure 1:
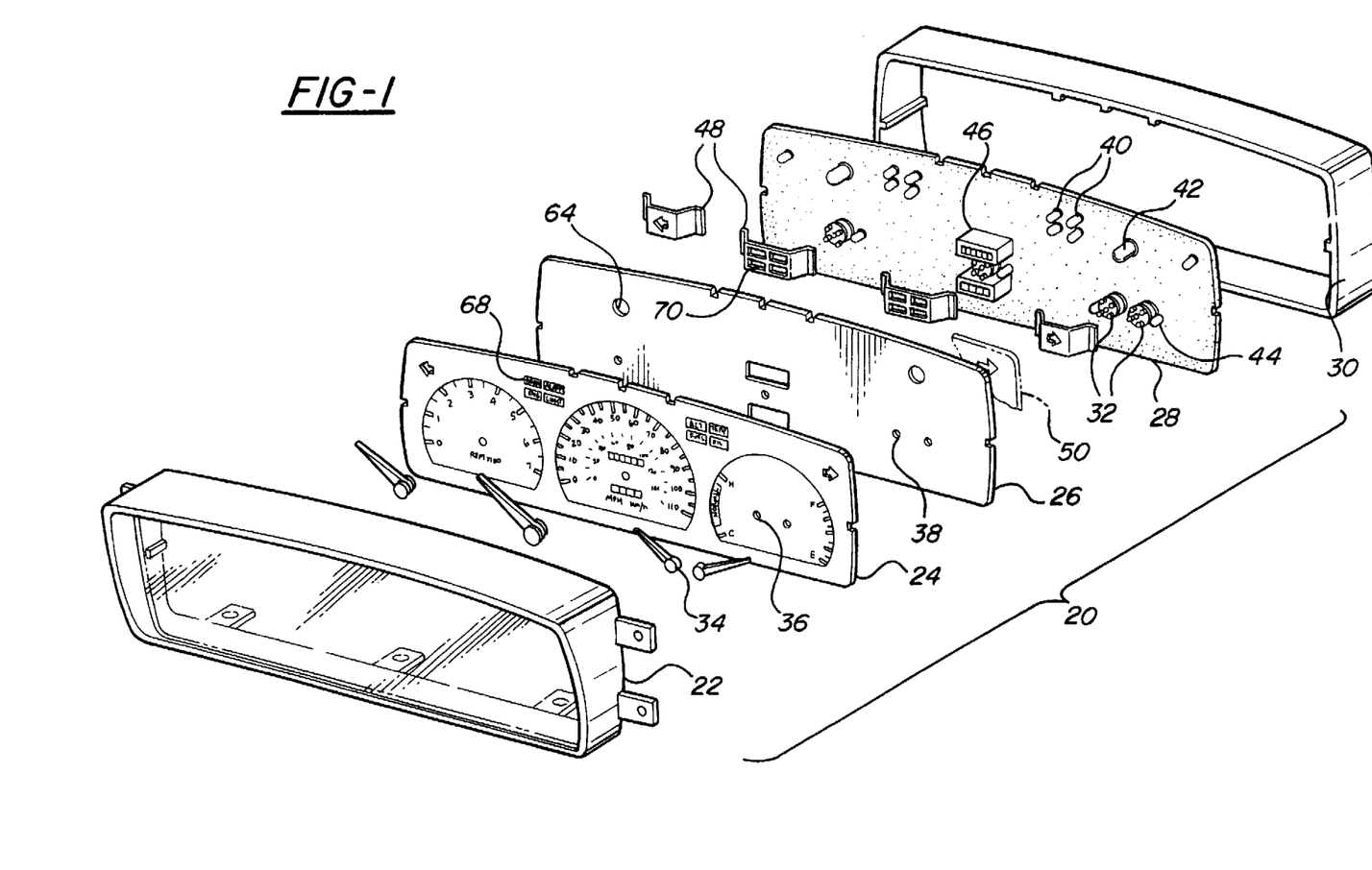
FIG. 1 is an exploded perspective view of an instrument panel of the present invention.

Circuit board 28 has mounted thereon a plurality of gauge motors 32 for driving analog gauge pointers 34 which are positioned forward of the graphic layer 24 as illustrated. Pointers 34 are operatively connected to a gauge motor output shaft which extends through aligned apertures 36 and 38 in graphic layer 24 and light distribution layer 26, respectively. Also mounted on circuit board 28 are a plurality of telltale lights 40, graphic layer illumination light 42, odometers 46 and telltale masks 48. Telltale masks 48 are mounted adjacent telltale or indicator lights such as turn signal indicators or the various other telltale lights typically used in modern automobiles.

As an alternative to discreet telltale masks 48 which are mounted on circuit board 28 adjacent the telltale lights, a one piece telltale mask layer 50 shown in dotted outline can be mounted on the rear surface of light distribution layer 26. Mask layer 50 will substantially cover the entire rear surface of light distribution layer 26, but for cutouts formed to accommodate the telltale lights, the gauge motors, the graphic layer light and the odometers as described more fully subsequently with reference to FIG. 5.

Figure 2:
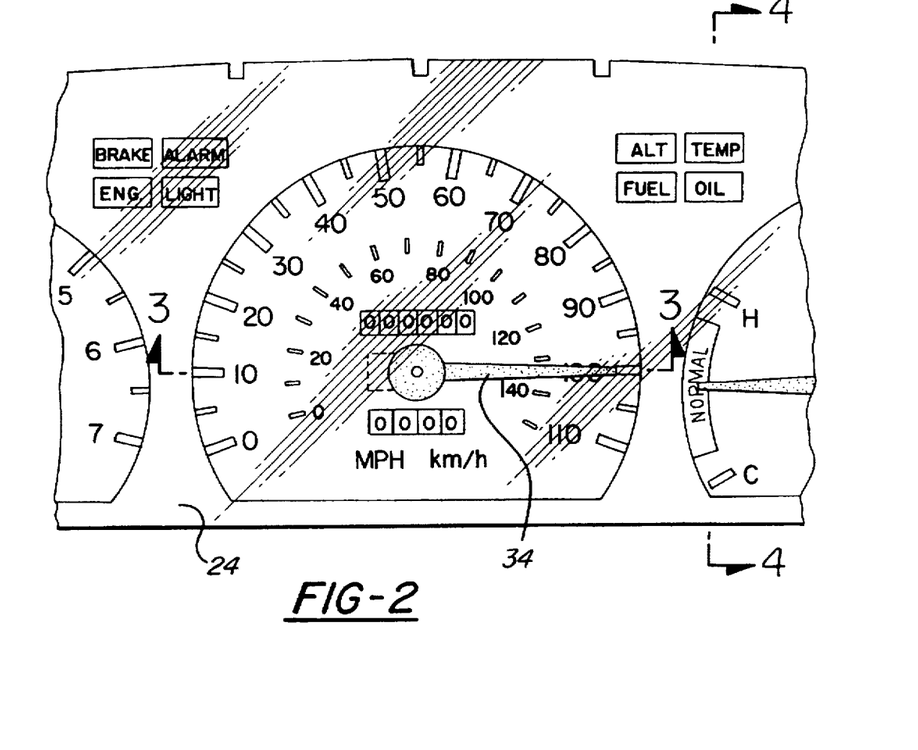
FIG. 2 is a front view of a gauge in the assembled instrument cluster of FIG. 1.

FIG. 2 illustrates a front view of the assembled instrument cluster focusing on the center analog gauge which forms the speedometer. From all outward appearances, the instrument cluster appears to be of the conventional analog type. Pointer 34, however, is illuminated independently of graphic layer 24, thereby enabling the pointer illumination to be varied to provide additional information to the vehicle driver. For example, the speedometer pointer can be increased in illumination intensity when the vehicle's high beam headlights are on. Alternatively, and/or in combination with providing the bright light indicator, the illumination of the speedometer pointer may be pulsated when some set speed has been exceeded in order to warn the driver of excessive speed. This could be a factory preset speed of 70 mph for example, or a speed related to a cruise control set point, i.e. 5 mph over cruise control set point. By having an independent illumination system for the pointer, it enables the vehicle designer wide flexibility in instrument cluster design.

Figure 3:
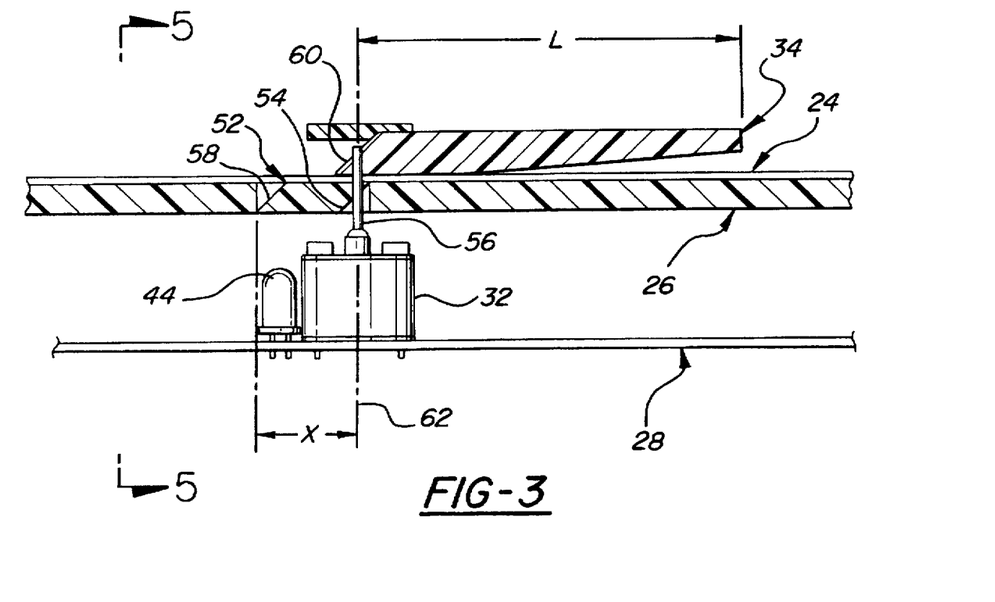
FIG. 3 is a cross-sectional view taken along section line 3—3 of FIG. 2.

FIG. 3 illustrates a sectional view taken along line 3—3 of FIG. 2. Gauge pointer 34 is illuminated by gauge pointer light 44 which is mounted on circuit board 28. Gauge pointer light 44 directs light upward to light distribution layer 26. Integrally formed in light distribution 26 is an integrally formed facet detail 52. Facet 52 has an inclined first reflective surface 54 which has a vertical aperture extending therethrough aligned with gauge motor 32. Gauge motor output shaft 56 extends through the aperture in first reflective surface 54 and is affixed to pointer 34 as illustrated. Facet 52 is also provided with a second reflective surface 58, immediately above pointer light 44. Light directed upward from pointer light 44 is reflected 90° toward the gauge motor output shaft to first reflective surface 54 which in turn reflects the light vertically parallel to the gauge motor output shaft to enter pointer 34. Light entering pointer 34 reflects off reflective surface 60 and passes generally radially along the length of gauge pointer 34.

Pointer light 44 is capable of illuminating pointer 34 without significantly affecting the illumination of the scale indicia on graphic layer 24. In order to minimize the occurrence of pointer light 44 affecting the illumination of the graphic layer, the location of the pointer light relative to gauge motor axis 62 will be kept as short as possible. Ideally, the outermost portion of pointer light 44 will be spaced from gauge motor axis 62 a distance X which will be less than half of pointer length L. In the case of large gauges like speedometers and tachometers, distance X will be ideally less than one-third of pointer length L. This dimensional relationship allows ample room for scale indicia on the graphic layer without the need for additional light pipe components for introducing light into the pointer.

In order to keep distance X the spacing of the pointer light and the gauge motor axis as small as possible, it is necessary to use a small diameter gauge motor and a small light. Preferably, the analog gauge of the present invention will be fabricated using a miniature air core gauge of the type shown in U.S. Patent application Ser. No. 08/061,954, entitled "Miniature Crossed-coil Gauge Having Active Flux Ring (as amended)" or a miniature iron core gauge shown in U.S. Pat. No. 5,355,373 entitled "Electric Motor, Controller Therefore and Methods for Controlling and Assembling Same", both of which are incorporated by reference herein.

Pointer light 44 can be provided by a miniature incandescent bulb or by a high power LED. High powered LEDs manufactured by Hewlett Packard have proven to work quite satisfactorily in the present application, particularly, HPW-M300, HPWA-MH00 and HPWA-ML00 LEDs and described in "High Power Automotive LED" technical data sheet, copyright 1994. Alternatively, bi-color solid state lamps, also available from Hewlett Packard, part no. MLMP-0800 and MLMP-4000 can be utilized when it is desired to vary pointer color.

Hewlett Packard bi-color solid state lamps have two alternative output colors, red and green. A gauge pointer measuring a parameter within normal limits can be illuminated using green light and if the measured parameter falls outside of predetermined range, the pointer light color can be changed to red. For example, a tachometer pointer could change from green to red as the speed approaches the maximum or "red line" limit. Similarly, an oil pressure gauge or a fuel gauge pointer could be changed from green to red if the oil pressure or the fuel tank level dropped below a predetermined threshold. In addition to changing the pointer color, the pointer lamp can pulsate to further warn the vehicle driver that the measured parameter is further out of the desired operating range.

Figure 4:
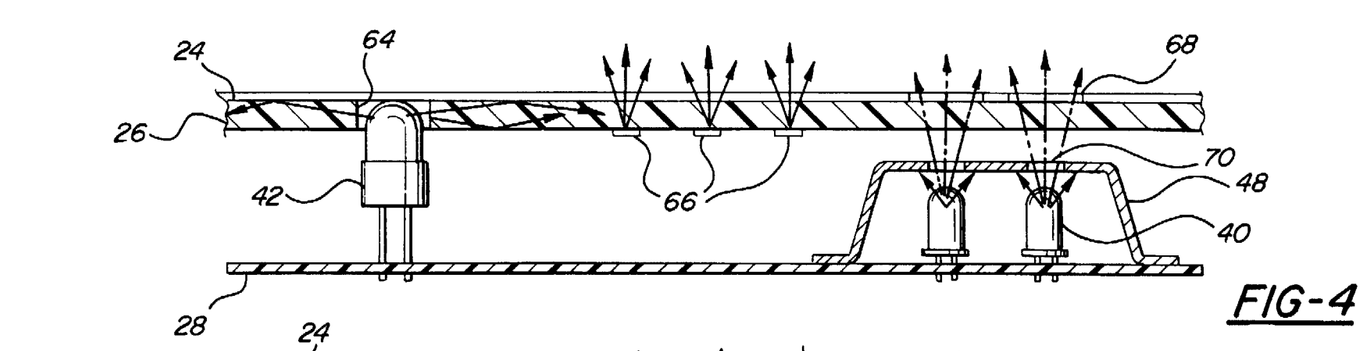
FIG. 4 is a cross-sectional view taken along line 4—4 of FIG. 2.

Light is introduced into the light distribution layer 26 by graphic layer illumination light 42 shown in FIG. 4. Light distribution layer 26 is provided with an aperture 64 sized to receive light 42. Light distributed by light 42 enters the light distribution layer 26 as illustrated and is distributed throughout light distribution layer 26 reflecting between the front and rear surface of the light distribution layer. Since the angle of the light within the light distribution layer is less than the critical angle, light does not escape. The critical angle is calculated in a conventional manner based upon the relative refracted index of light in the acrylic light distribution layer and air. When the light strikes painted regions 66 applied on the backside of light distribution layer 26, light exits the light distribution layer illuminating the painted regions and is disbursed upwardly through the light distribution layer as illustrated in FIG. 4. Painted regions 66 are stenciled on the back of the light distribution layer in the area opposite the scale indicia formed on graphic layer 24. In this manner, light is only utilized where needed and the entire graphic layer is not illuminated.

FIG. 4 also illustrates the orientation of telltale lights 40 relative to circuit board 28, mask 48, the light distribution layer 26 and graphic layer 24. Telltale lights 40 are positioned on the circuit board 28 immediately below telltale indicia 68 printed in graphic layer 24. In order to prevent the light of telltale light 40 from entering the light distribution layer and illuminating adjacent indicia on the graphic layer, mask 48 is provided to limit the graphic area to be illuminated by light 40. The mask 48 ensures that the light passing through the light distribution layer is always at an angle less than the critical angle so that it passes freely therethrough. Accordingly, mask 48 is provided with an aperture 70 appropriately sized to limit light cone angle and facilitate the close orientation of telltales.

Figure 5:
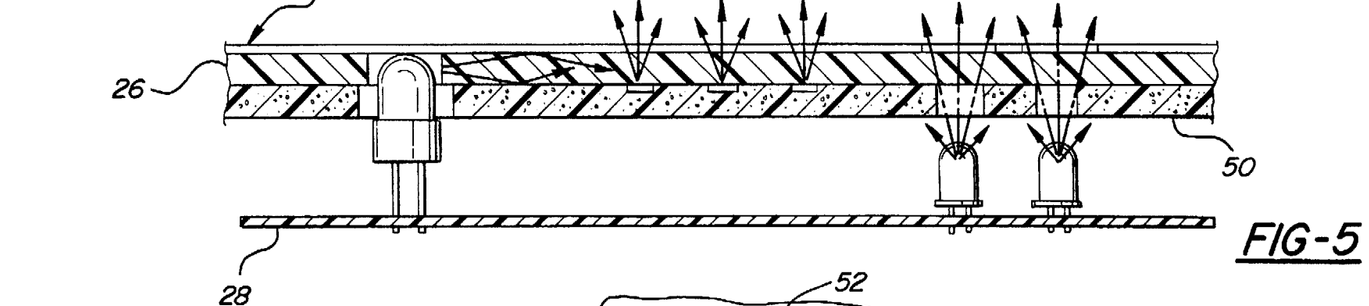
FIG. 5 corresponds to FIG. 4 showing an alternative mask design.

FIG. 5 illustrates the use of mask layer 50 as an alternative to discreet mask 48 as previously discussed. Mask layer 50 is formed of a low reflective opaque material such as die cut foam attached to the rearward most side of the light distribution layer 26 by a series of adhesive dots. Mask layer 50 additionally serves to prevent extraneous light between the mask layer and circuit board 28 from affecting the illumination of graphic layer indicia. Preferably, mask layer 50 is formed of a die cut sheet polyurethane foam having a thickness of ⅛ inch.

Figure 6:
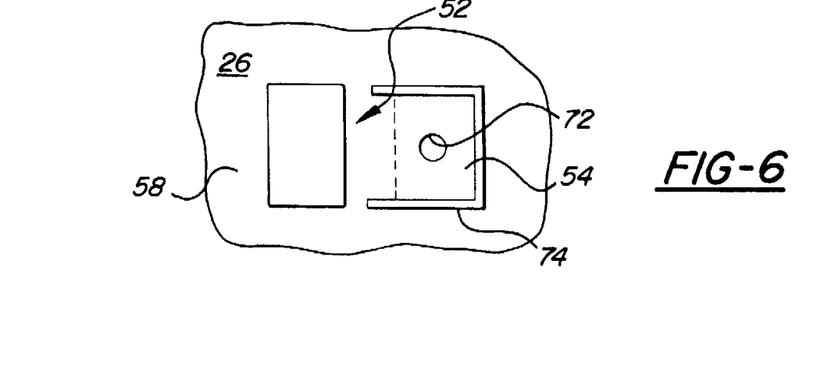
FIG. 6 is an enlarged fragmentary front plan view of a portion of a light distribution layer showing facet detail.

FIG. 6 illustrates a top plan view of facet 52 formed in light distribution layer 26. Facet 52 is integrally molded into the light distribution layer defining first light reflective surface 54, second light reflective surface 58 and an aperture 72 extending through the first light reflective surface. Slot 74 extends around a portion of the periphery of the fastened adjacent first light reflective surface 54 as illustrated in FIG. 6 to minimize light dispersion into light distribution layer 26.

Figures 7A, 7B:
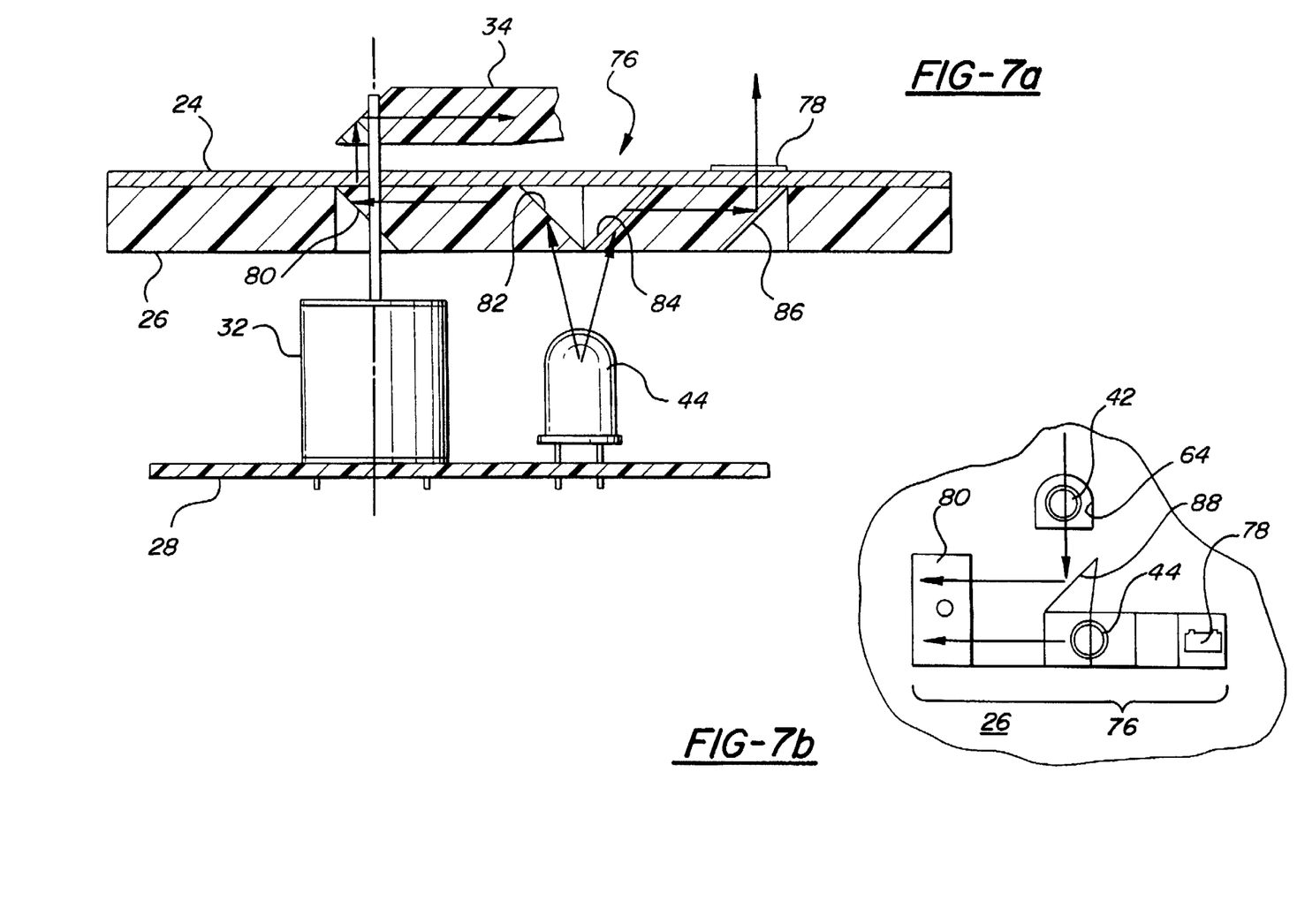

FIGS. 7a and 7b illustrate a second integral facet embodiment 76 designed to illuminate pointer 34 as well as associated telltale 78. Second facet embodiment 76 has a first and second light reflective surface 80 and 82 which function similarly to light reflective surfaces 54 and 58 described with reference to FIG. 3. Pointer light 44, however, is positioned at the outboard edge of second reflective surface 82 so that a portion of the light is directed upon third reflective surface 84 which is then reflected upward by fourth reflective surface 46 through graphic layer 24 to illuminate telltale indicia 78.

As illustrated in FIG. 7b, telltale 78 is a standard battery warning indicia which would be used in association with an analog volt meter. Telltale light 44 will only illuminate the pointer and the telltale indicia 78 when a fault signal is present, i.e. low or high voltage. During normal operation, pointer 34 will be illuminated by the graphic layer illumination light 42.

Fifth reflective surface 88, shown in FIG. 7b, reflects light from graphic layer illumination light 42 to the pointer via first reflective surface 80. It should be appreciated that third and fourth reflective surfaces 84 and 86 could be eliminated in a design where light 44 directly illuminates telltale indicia 78. The use of third and fourth reflective surfaces 84 and 86 enable telltale indicia 78 to be located a greater distance from the gauge motor axis.

Figures 8, 9:
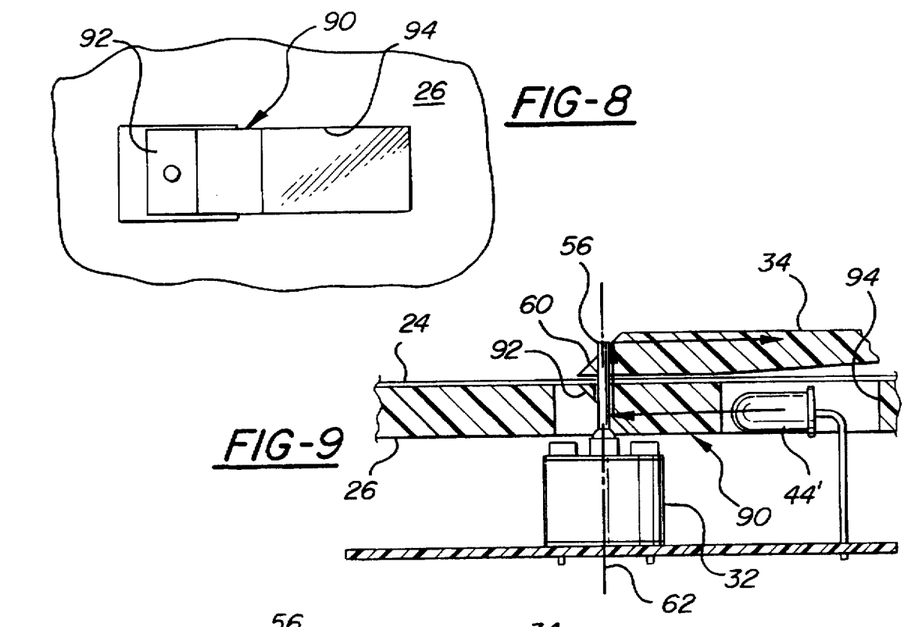
FIGS. 8 and 9 are alternative plan and side elevations of a third facet embodiment.

FIGS. 8 and 9 illustrate a third facet embodiment 90 which is integrally molded into light distribution layer 26. Facet 90 is provided with a first light reflective surface 92 similar to first light reflective surface 54 described with reference to facet 52 of FIG. 3. In the third facet embodiment shown in FIGS. 8 and 9, there is no second reflective surface, rather an opening 94 is integrally formed in the light distribution layer 26 to enable pointer light 44' to be oriented in the opening as illustrated to direct light radially through facet 90 toward motor output shaft 56.

Figure 10:
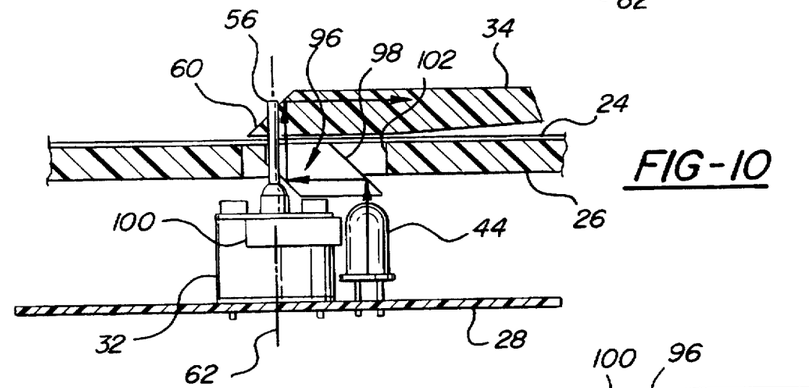
FIGS. 10 and 11 are side and plan views of 4th facet embodiment.
Figure 11:
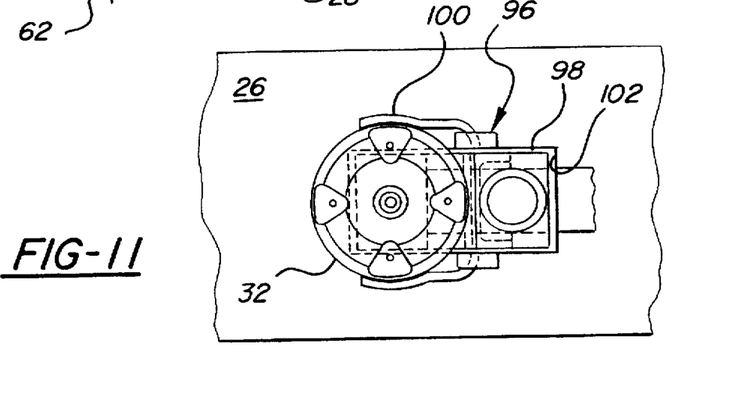

FIGS. 10 and 11 illustrate a fourth facet embodiment 96 which is not integrally molded into light distribution layer 26. Facet 96 is provided with a clear plastic prism 98 and an attachment bracket 100 for affixing the facet 96 to gauge motor 32. The gauge motor with installed facet 96 can be installed on the circuit board as a unit. Aperture 102 is formed in light distribution layer 26 and is sized to facilitate the insertion of facet 96 into the light distribution layer as shown. Since light is not being transmitted from the light distribution layer to facet 96, relatively large clearances can be provided between facet 96 and opening 102 to facilitate assembly. Additionally, since facet 96 is pre-installed on the gauge motor 32, alignment between the gauge motor output shaft 56 is easily maintained.

Figure 12:
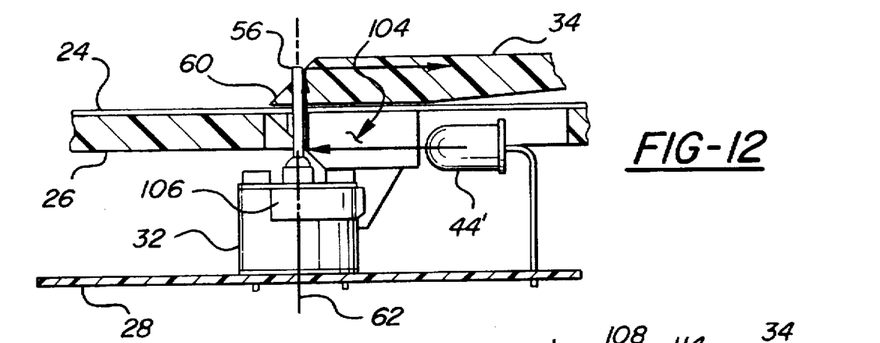
FIG. 12 is a side view of a fifth facet embodiment.

FIG. 12 illustrates a fifth facet embodiment 104. Facet 104 is similar to integrally molded facet 92 shown in FIG. 9, however, facet 104 is a discreet element affixed to gauge motor 32 by a clip 106 in a manner similar to fourth facet embodiment 96 shown in FIGS. 10 and 11.

Figure 13:
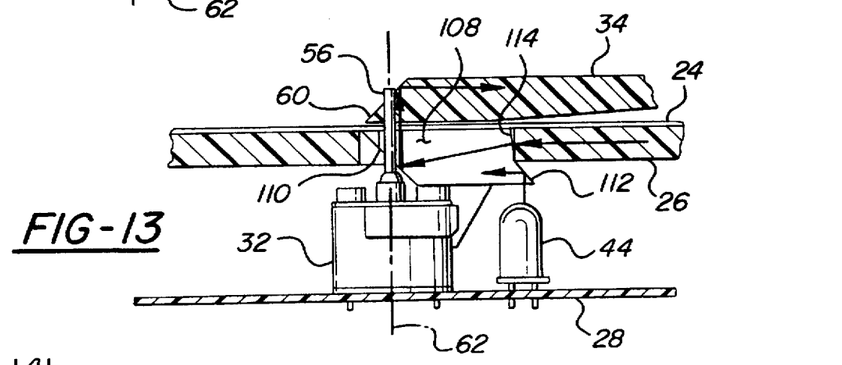
FIG. 13 is a side elevational view of a sixth facet embodiment.

A sixth facet embodiment 108 is shown in FIG. 13. Facet 108 is similar to facet 96 shown in FIG. 10, except the gauge pointer is illuminated both by light from light distribution layer 26 as well as pointer light 44. Facet 108 is provided with a first reflective surface 110 surrounding gauge output shaft 56. A smaller second reflective surface 112 is oriented directly above pointer light 44. Second reflective surface 112 terminates at the rearward surface of light distribution layer 26. A non-reflective face 114 extends from the second reflective surface 112 to span the thickness of distribution light 26. Light from light distribution layer 26 passes through non-reflective face 114 and is directed toward the first light reflective surface 110 to reflect upward into the pointer as illustrated. In this embodiment, pointer 34 can be normally illuminated by the light distribution layer and pointer light 44 can be used to supplement pointer illumination or change pointer color in order to indicate a fault signal or the like.

Figures 14A, 14B:
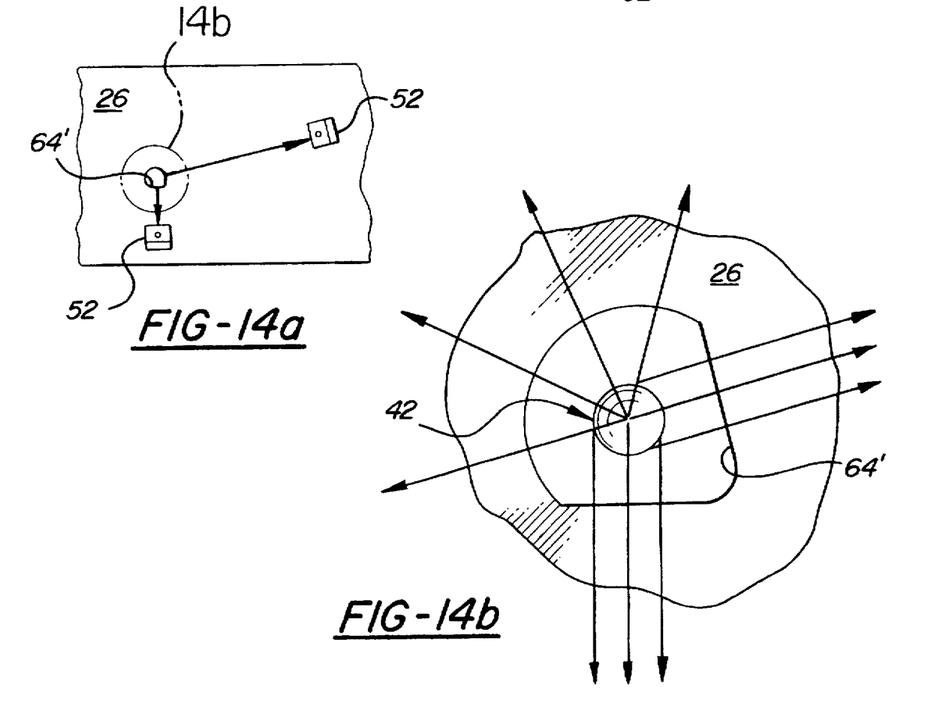

FIGS. 14a and 14b illustrated an alternative aperture 64' formed in light distribution layer 26 as opposed to a cylindrical aperture described with reference to FIG. 1 and 4. A non-cylindrical aperture 64' is utilized in the FIGS. 14a and 14b light distribution layer embodiment in order to direct additional light to facets 52 formed in the light distribution layer 26. It should be appreciated that a wide variety of non-symmetrical apertures can be formed in the light distribution layer in order to distribute light within the light distribution layer on a non-uniform basis.

The non-symmetrical aperture provides design flexibility and is particularly helpful when pointers are illuminated solely by the light distribution layer in normal operation as opposed to utilizing a discreet pointer light as described previously. It should be appreciated that in addition to the through hole type aperture 64' illustrated which has graphic layer illumination light 42 centered therein. A generally frusto conical aperture may be used having series of flats, concave or convex regions to direct light from a circuit board mounted lamp throughout light distribution layer 26 on a non-uniform basis directing additional light in the direction of remotely located facets.

Figure 15:
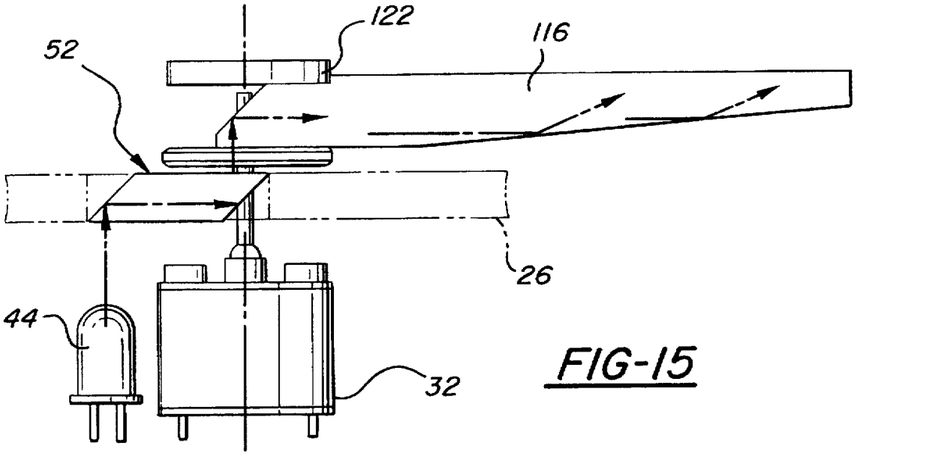
FIG. 15 is a side elevational view of an analog gauge assembly having a novel pointer construction.
Figure 16:
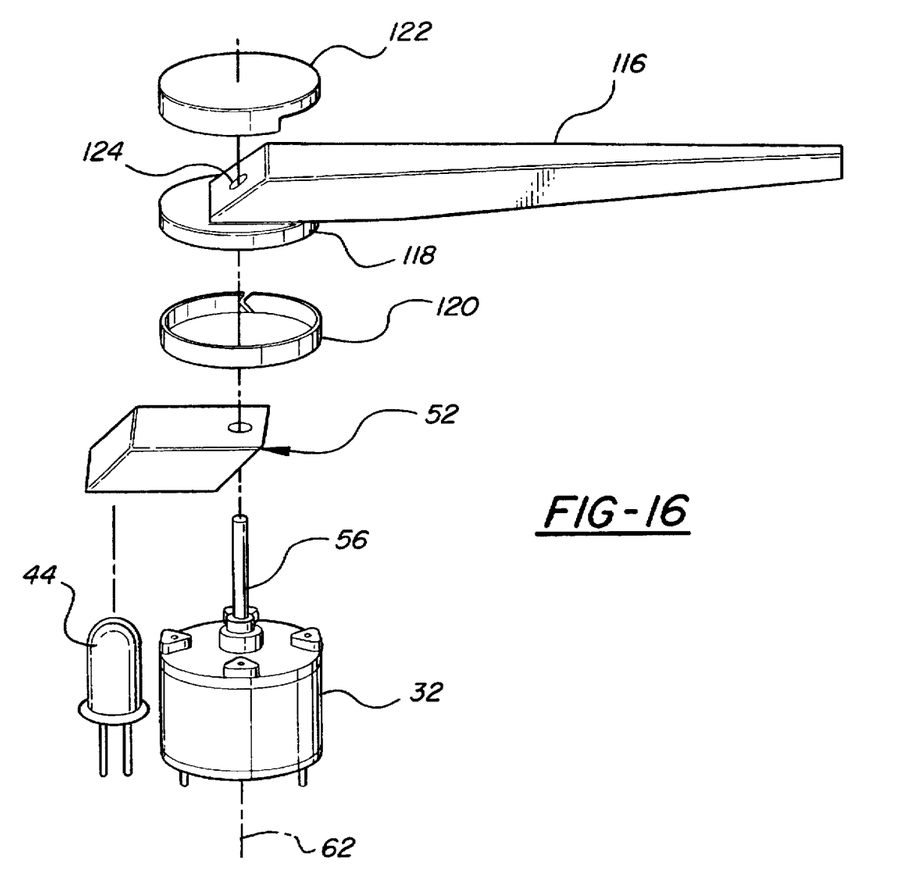
FIG. 16 is an exploded perspective view of the analog gauge assembly of FIG. 15.

FIGS. 15 and 16 illustrate an alternative pointer construction. Pointer 116 is provided with a hub 118 surrounded by a spring clip 120. A decorative cap 122 snaps on to pointer 116 to form a pointer assembly. Aperture 124 in pointer 116 as manufactured, freely slides over gauge output shaft 56 enabling free relative rotation with minimal friction. After the instrument panel is partially assembled and the gauge motor affixed relative to the graphic layer, pointer 116 with spring clip 120 installed, is slipped over gauge output shaft 56. The pointer is then positioned at a predetermined location relative to the scale indicia, typically mid-range in the pointer travel. In the case of a speedometer, pointer 116 could be positioned at the 50 mph location. With the gauge pointer held in place, the gauge motor is then electrically powered and driven to the corresponding orientation, i.e. 50 mph. When aligned, the gauge pointer and cooperating gauge motor output shaft is exposed to an energy source which causes the pointer to permanently bond to the gauge motor output shaft.

One suitable energy source is an induction heating coil which causes the plastic forming a gauge pointer immediately surrounding the gauge motor output shaft to locally melt, forming a secure bond with the gauge motor output shaft. Spring clip 120 serves to urge the softened plastic of the pointer into cooperation with the gauge motor output shaft when heated by the energy source.

In order to minimize any errors resulting in friction, the pointer can be vibrated or the gauge motor driven cyclically above and below the set point slightly to enable the pointer and gauge motor output shaft to come into proper alignment.

It should be appreciated that while spring clip 120 is helpful for insuring a bold between the pointer hub 118 and the output shaft 56, spring clip 120 is not critical and adequate bond attachments may be achieved without the use of spring clip 120.

Alternatively, other energy sources can be used in order to effectuate the bonding of the pointer to the gauge motor output shaft. As opposed to dry assembly of the pointer on the gauge motor output shaft, curable adhesives may be used. Preferably these adhesives will be curable in the presences of an energy source such as light and heat so that a very quick bond can be achieved minimizing assembly time. Any number of conventional light curable or heat curable adhesives can be used provided that they are compatible with the plastic material utilized to form pointer. This method of assembly of an analog gauge enables pointers to be very accurately positioned relative to the gauge motor output shaft without exerting axial loads on the gauge motor as frequently occurs when pointers are pressed on to the shaft.

Figure 17:
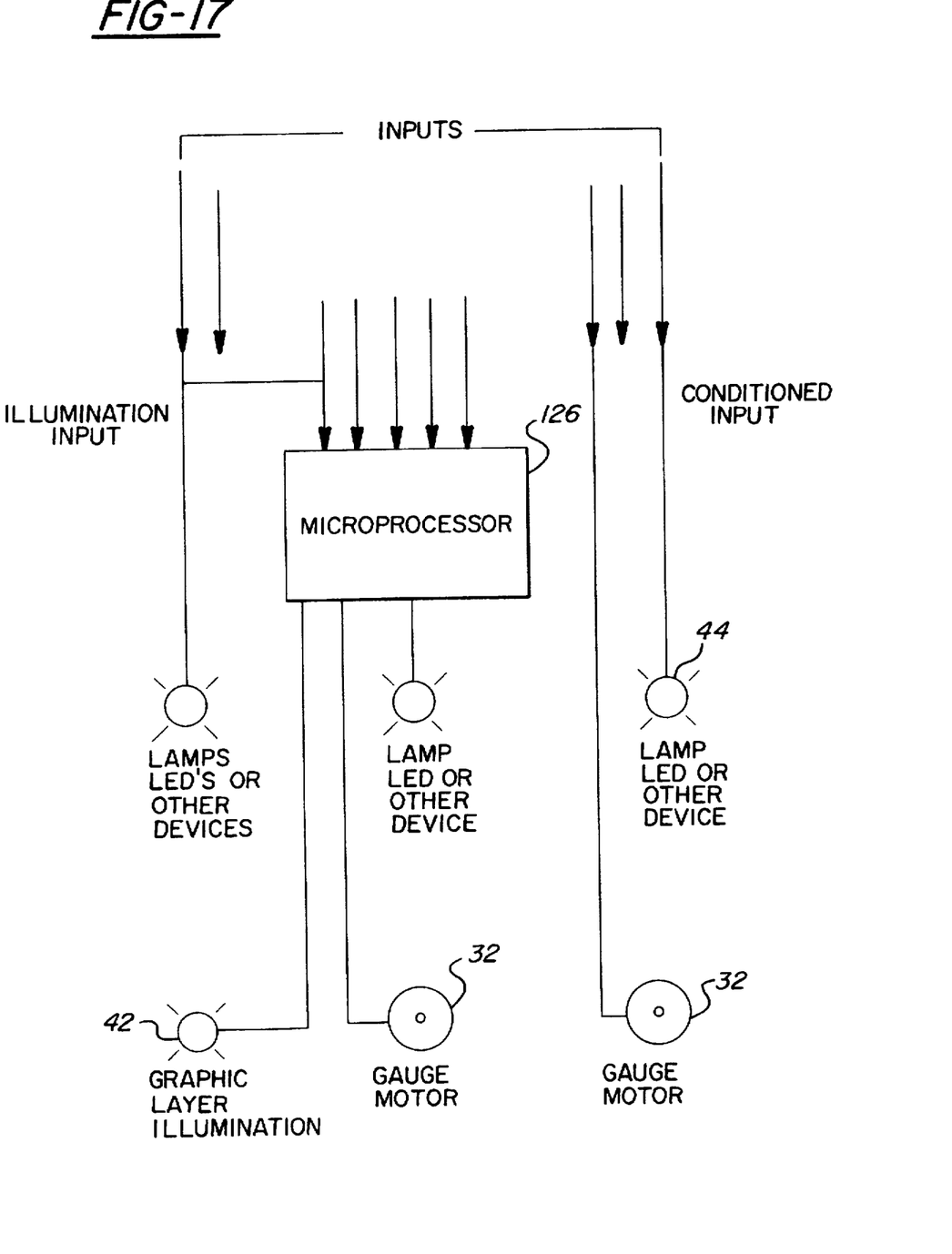
FIG. 17 is a schematic illustration of a control circuit for regulating the operating of an instrument panel utilizing the present invention.

FIG. 17 is a schematic illustration of a representative control system for an instrument panel of the present invention. Gauge motors 32 can be directly driven by a conventional condition input from a fuel gauge or an oil pressure transducer and driven directly. When the gauge motor is directly driven by condition input, the associated lamp LED or other illuminating device 44 associated with the gauge pointer should ideally also be provided by a similarly conditioned input to enable the pointer illumination to be varied when the measured parameter falls outside of a selected range, namely, low fuel or low oil pressure or the like.

Alternatively, gauge motors can be driven by a microprocessor 126. A microprocessor gauge motor provides a great deal of design flexibility to fully utilize the pointer light 44 to convey maximum information to the vehicle driver. Microprocessor 126 is provided with a series of inputs enabling convenient programming of the microprocessor to pulsate the pointer light or change a pointer illumination to transmit additional information to the vehicle driver.

As previously described, the pointer associated with the speedometer can be varied in illumination dependent upon vehicle speed or a cruise control input to the microprocessor. Similarly, low voltage, oil pressure, fuel, coolant temperature or a host of other inputs to the microprocessor can be utilized to provide information to the user via pointer illumination to attract the user's attention to the measured parameter of an associated analog gauge. Of course, various combinations of gauges can be used in a signal instrument panel. Where a little signal conditioning is needed as in the case of a volt meter, a conventional conditioned input gauge motor may be used in an instrument panel also having gauges controlled by a microprocessor. The microprocessor can also be used to control the illumination of the graphic layer. Alternatively, the graphic layer illumination light can be controlled by a rheostat type input regulated by the vehicle driver.

The present invention provides a great deal of design flexibility to engineers developing instrument clusters of the future and it should be appreciated to those skilled in the art that a number of variations of the present invention can be made without departing from the scope of the claimed invention. It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. An analog gauge comprising:
   a graphic layer having a front surface defining scale indicia, a rear surface, and an aperture extending through the graphic layer in proximity to the scale indicia;
   a gauge motor mounted adjacent the graphic layer rear surface, said gauge motor having a rotary output shaft locally normal to the graphic layer aligned with the aperture;
   a gauge pointer oriented adjacent to the scale indicia on the graphic layer front surface, said gauge pointer affixed to and rotated by the gauge motor output shaft to provide analog information to a viewer of the gauge;
   a facet for redirecting light into the gauge pointer, said facet having a first light reflecting surface inclined relative to the gauge motor output shaft and a bore extending through the first light reflecting surface sized to enable the gauge motor output shaft to freely pass therethrough, said first light reflecting surface redirecting light in a path normal to the gauge motor output shaft to an axial path parallel to the gauge motor output shaft;
   a graphic layer light source cooperating with the graphic layer to illuminate the indicia thereon; and
   a pointer light source cooperating with the facet for illuminating the pointer, said pointer light source providing a variable degree of illumination to the pointer which may be regulated independent of the graphic layer light source.

2. The analog gauge of claim 1 further comprising a circuit board mounted rearward of and spaced from the graphic layer, said circuit board having mounted thereon the gauge motor and the pointer light source.

3. The analog gauge of claim 2 wherein said facet is provided with a second like reflecting surface to redirect light from the pointer light source to the first light reflecting surface.

4. The analog gauge of claim 3 wherein the facet is a discreet element affixed to the gauge motor.

5. The analog gauge of claim 1 further comprising a light distribution layer mounted adjacent to the rear surface of the graphic layer for transmitting light provided by the graphic layer light source to the scale indicia.

6. The analog gauge of claim 5 wherein the facet is integrally formed into the light distribution layer.

7. The analog gauge of claim 1 wherein said pointer light source comprises an LED.

8. The analog gauge of claim 7 wherein said LED is capable of providing two different colors of light.

9. The analog gauge of claim 1 further comprising a gauge control providing a gauge output for regulating the gauge motor and a pointer light output for varying illumination of the pointer light as a function of pointer position.

10. The analog gauge of claim 9 wherein said gauge control causes the pointer light to pulsate at a selected pointer position.

11. The analog gauge of claim 9 wherein said pointer light source comprises a two color LED and said gauge control varies the LED output color as a function of pointer position.

* * * * *